May 9, 1933. H. B. RING ET AL 1,908,056
SOLDERING IRON
Filed Aug. 22, 1932
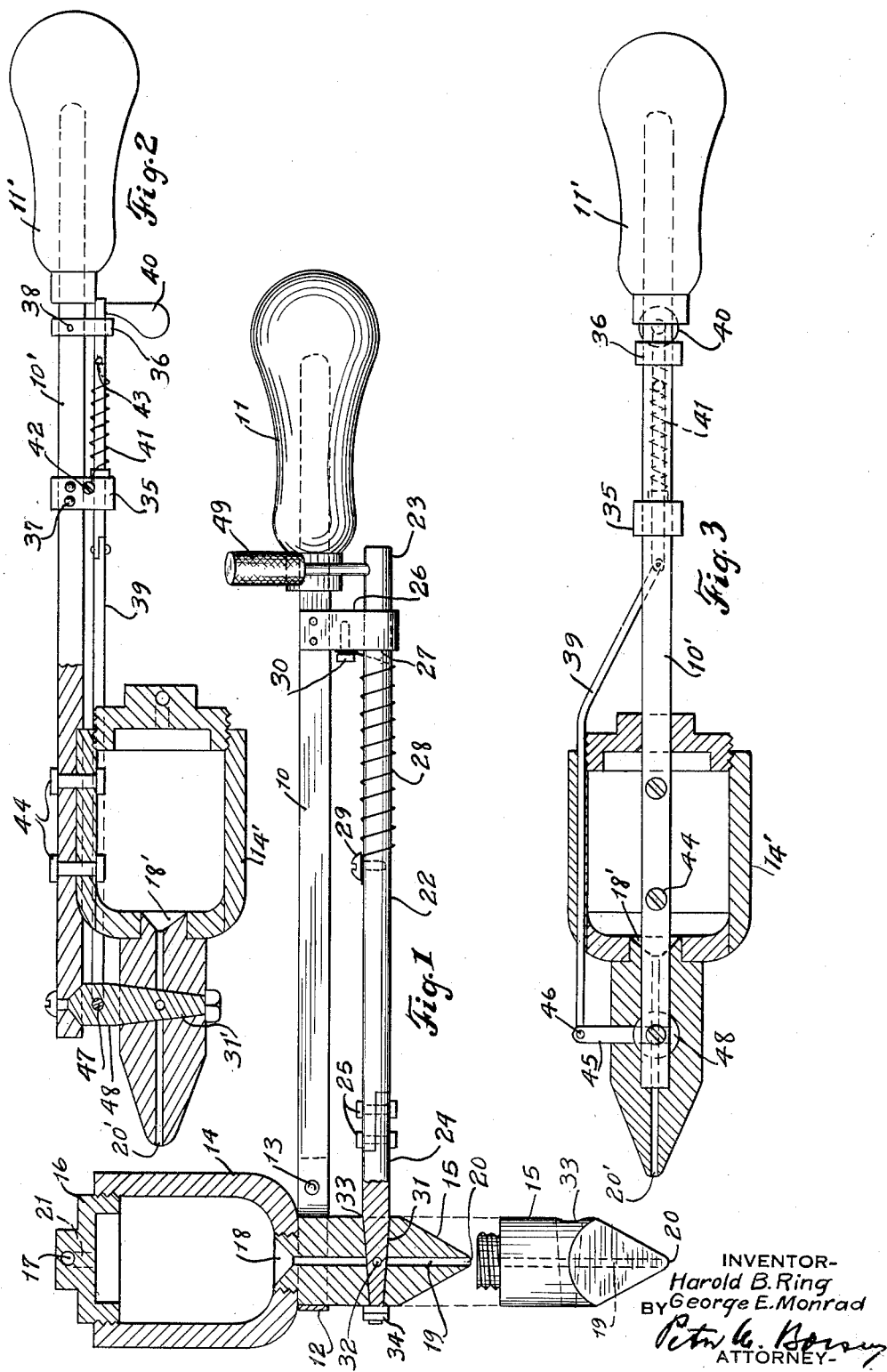
INVENTOR-
Harold B. Ring
BY George E. Monrad
ATTORNEY- Patented May 9, 1933

1,908,056

UNITED STATES PATENT OFFICE

HAROLD B. RING AND GEORGE E. MONRAD, OF BROOKLYN, NEW YORK

SOLDERING IRON

Application filed August 22, 1932. Serial No. 629,786.

This invention relates to new and useful improvements in soldering irons, and has for its object the provision of a soldering iron, which is comparatively simple of construction, durable, of a convenient and most suitable shape, and very easy to manipulate in the performance of soldering work.

The parts, constituting the essential features of this device, are arranged in such a manner that the said device will not easily get out of working order, contrary to the devices now commonly known, which latter are usually more or less crowded with mechanical parts arranged in the interior, and in connection with the inner chamber and channels of such devices.

On account of the said arrangement of the parts in my device, and the comparatively exterior position of the said parts or controlling elements, the latter permit themselves to be embodied in a stronger form, thereby constituting a more substantial structure than it would otherwise have been possible to provide, if the said elements had been arranged within the apparatus.

In view of the aforesaid desirable form of construction, it is estimated that the cost of manufacturing will be very small.

With the above and other objects in view, this invention consists of the novel features of construction, combination and arrangement of parts, hereinafter fully described, claimed and illustrated in the accompanying drawing forming part of this specification, and in which similar characters of reference indicate corresponding parts in all views, and in which:

Figure 1 is an elevational view of our device, partly in section, showing a detachable screwthreaded tip or soldering point.

Figure 2 is a top plan view of our device slightly modified, and partly in section, while Figure 3 is an elevational view, also partly in section, of the device shown in Figure 2.

Referring more particularly to the drawing, 10 indicates a substantially flat bar, which has one end provided with a handle 11 and the other end bent upon itself, as at 12, and secured together by a bolt 13; the said bend has the form of a circular opening adapted to receive a receptacle, or container 14, with a head 15 screwed into the latter, therein. It is obvious, however, that the said container and head may be connected together in any suitable manner. The top of the said receptacle is closed by a cap-member 16, which is screwed into the said receptacle and is provided with an orifice 17 through the square top-portion thereof for the purpose of facilitating the unscrewing of the cap-member 16. The said orifice may also, if desired, connect with a ventilating channel shown in dotted lines through the cap-member and indicated by 21, in case a melting of the soldering material is to be performed within the receptacle and with the top of the latter closed by the cap 16.

The receptacle 14 is at the bottom provided with a depression 18, which registers with a comparatively narrow channel 19 formed at the center of the head-portion 15 and tip-portion 15', the said channel terminating in an outlet at the point 20 of the said tip-portion.

While the form of the outlet 20 may be varied, the tapered end of the tip-portion terminates preferably in a rectangular bottom edge for manipulating purposes.

The said head-portion 15 is, as shown, threaded into the receptacle 14, thereby permitting a renewal of the former, when this is worn out by wear and tear.

Below the bar 10 is arranged a controlling bar 22, the main part 23, of which may consist of iron or steel, while the shorter part 24 consists of copper, or any other special material used in intimate connection with soldering material in a molten state. The said parts 23 and 24 are solidly secured together, as shown by screws 25.

A bracket 26, solidly attached to the bar 10, and having an opening 27 at its lower end, forms a seat for the said controlling bar 22, which is turnable in the said seat, and is held in a certain fixed position by means of a coiled spring 28 mounted between a screw 29 on the said bar 23 and a screw 30 on the bracket; a handle 49 attached to the end of the said bar 22 serves to turn the latter and regulate and control the flow of the soldering material from the receptacle 14. This regulation and control is made possible by the shorter end-portion of the controlling bar, which end-portion is tapered, as shown at 31, to form a valve with a central bore 32 therein adapted to register with the channel 19 of the head-portion 15 of the apparatus, when in a certain position, as will clearly be observed from the drawing. The said tapered end-portion is seated in a correspondingly formed transverse opening 33 formed in the said head portion, the said tapered end-portion being held snugly in place by means of a double screw-nut 34, which is threaded upon the end of the said tapered portion 31.

In the modification shown in Figures 2 and 3, the container, or receptacle 14' is flush with the bar 10' which supports the apparatus; the said bar has a handle 11', while two brackets 35 and 36 are attached to it by means of screws 37 and 38, the said brackets being at their lower ends provided with openings, shown in Figure 2 in dotted lines, for seating turnably therein the controlling rod-member 39.

The said rod terminates at one end in the minor knob, or handle 40, while it is actuated by a spring 41, one end of which is secured in the bracket 35, as shown at 42, and the other end in the rod proper by means of an opening 43 in the said rod through which the said spring 41 is inserted and secured to the said rod.

The bar 10' has the receptacle 14' secured to it by means of screw bolts 44, 44; this end of the bar serving also as a support for the controlling arrangement of the valve-system.

The receptacle and its relevant parts correspond as to arrangement and construction substantially to these described and shown in Figure 1.

The controlling rod-member 39 is, however, in this embodiment of the device connected to a short lever 45, which is seated in a bifurcated end portion of the said rod, and secured to the latter by means of a screw 46. The said lever is in turn connected to the tapered valve 31' by means of a reduced portion 47 of the said lever, which penetrates the outside part 48 of the valve, and is solidly attached to the latter.

The construction and operation of the valve is otherwise substantially similar to the construction shown in Figure 1.

It is obvious that changes may be made in the form, construction and arrangement of the several parts, as shown, within the scope of the appended claims, without departing from the spirit of the invention, and we do not therefore wish to limit ourselves to the construction and arrangement shown, and described herein.

What we claim as new, and desire to secure by Letters Patent of the United States, is:

1. In a device of the class described, a handle bar having one end bent upon itself to form a circular opening, a bolt securing the said bend, a controlling bar arranged below the first bar and being turnably mounted in a bracket, the latter being secured to the handle, an actuating spring arranged upon the controlling bar, and secured thereto by a screw upon the latter and upon the said bracket, respectively, and an operating handle integral with the said controlling bar, a container, a head-portion screwed into the latter and being mounted in the circular opening of the said handle bar, the head-portion being formed with a vertical opening registering with an opening in the said container, and having a tapered transverse opening intersecting the said vertical opening thereof; the said tapered opening being adapted to receive a correspondingly tapered portion of the end of the operating bar, and means for securing the latter in closely fitting position and turnable in the said head-portion.

2. A soldering iron of the class described, comprising, in combination, a handle bar having one end bent upon itself to form a circular opening, a bolt securing the said bend, a controlling bar arranged below the first bar and being turnably mounted in a bracket, the latter being secured to the said handle bar, an actuating spring mounted upon the controlling bar, and being secured thereto by a screw upon the latter and upon the said bracket, respectively, and an operating handle integral with the said controlling bar, a container, a cap-portion screwed into the said container, and ventilating means arranged in the said cap-portion, a head-portion screwed into the bottom of the container and being mounted in the circular opening of the said handle bar, the said head-portion being formed with a vertical opening registering with an opening formed in the container, and having a tapered transverse opening intersecting the said vertical opening thereof, the said tapered opening of the head-portion being adapted to receive a correspondingly tapered portion of the end of the operating bar, and a nut mounted upon the end of the latter to secure it in position.

Signed at New York city, in the county of New York, and State of New York this 30th day of July, A. D. 1932.

HAROLD B. RING.
GEORGE E. MONRAD.